US012749913B2

(12) United States Patent
Chaney et al.

(10) Patent No.: US 12,749,913 B2
(45) Date of Patent: Sep. 29, 2026

(54) FIELD DEVICES AND SYSTEMS

(71) Applicant: Schneider Electric Systems USA, Inc., Foxborough, MA (US)

(72) Inventors: Richard Chaney, Foxborough, MA (US); Mark Bertolina, Foxborough, MA (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 0 days.

(21) Appl. No.: 18/377,919

(22) Filed: Oct. 9, 2023

(65) Prior Publication Data

US 2024/0120767 A1 Apr. 11, 2024

Related U.S. Application Data

(60) Provisional application No. 63/414,845, filed on Oct. 10, 2022.

(51) Int. Cl.
*H02J 9/00* (2006.01)
*H02J 7/00* (2026.01)

(52) U.S. Cl.
CPC ................ *H02J 9/00* (2013.01); *H02J 7/855* (2026.01)

(58) Field of Classification Search
CPC ................................. H02J 9/00; H02J 7/0063
See application file for complete search history.

(56) References Cited

U.S. PATENT DOCUMENTS

2010/0007247 A1 1/2010 Tabelander
2010/0156183 A1 6/2010 Kah et al.
2012/0091809 A1 4/2012 Müller et al.
2013/0179697 A1* 7/2013 Nicholas .................. G06F 1/30 713/300
2014/0094985 A1* 4/2014 Hibiya .................. G05B 15/02 700/297
2014/0327475 A1* 11/2014 Groot ..................... H03K 17/22 327/143
2016/0094057 A1* 3/2016 Fiedler ............... G05B 19/0426 320/134
2017/0294691 A1 10/2017 Yamamoto et al.
2018/0287406 A1* 10/2018 Couvillon ............. H02J 7/0068
2018/0287408 A1 10/2018 Kutkut
2020/0303944 A1* 9/2020 Jonsson ................. G01R 19/10
(Continued)

FOREIGN PATENT DOCUMENTS

WO WO-2022167116 A1 * 8/2022 ........... G05B 19/042

OTHER PUBLICATIONS

International Search Report and Written Opinion mailed Jan. 25, 2024 in PCT/US2023/034738, 8 pages.

*Primary Examiner* — Menatoallah Youssef
*Assistant Examiner* — Duc M Pham
(74) *Attorney, Agent, or Firm* — Wolf, Greenfield & Sacks, P.C.

(57) ABSTRACT

A system can include a field device and a power limited source operatively connected to the field device and configured to supply a main power to the field device up to a power limit threshold. The system can include a bulk energy storage assembly operatively connected to the field device. The bulk energy storage assembly can be configured to provide a supplemental power to the field device when either the main power drops below a demand power from the field device, or when the demand power from the field device exceeds the power limit threshold.

20 Claims, 3 Drawing Sheets

(56) References Cited

U.S. PATENT DOCUMENTS

| | | | | |
|---|---|---|---|---|
| 2021/0311450 | A1 | 10/2021 | Schäuble et al. | |
| 2022/0045547 | A1* | 2/2022 | Al-Abdullatef ... | H02J 13/00032 |
| 2022/0317666 | A1 | 10/2022 | Friesen et al. | |

* cited by examiner

FIELD DEVICES AND SYSTEMS

CROSS-REFERENCE TO RELATED APPLICATIONS

This application claims priority to and the benefit of U.S. Provisional Application No. 63/414,845, filed Oct. 10, 2022, the entire contents of which are herein incorporated by reference in their entirety.

FIELD

This disclosure relates to field devices and systems.

BACKGROUND

An industrial operation or plant typically includes a plurality of industrial equipment. The industrial equipment can come in a variety of forms and may be associated with various processes, for example, depending on the industrial operation. For example, an industrial operation may include one or more field devices (e.g., RTUs, PLCs, actuators, sensors, HMIs) that are used to perform, analyze and/or control process variable measurements. These process variable measurements may include pressure, flow, level, and temperature, for example. The industrial operation or plant, and its associated equipment and process(es), may be operated and controlled using a distributed control system (DCS) in some instances.

Such conventional methods and systems have generally been considered satisfactory for their intended purpose. However, there is still a need in the art for improvements. The present disclosure provides a solution for this need.

SUMMARY

A system can include a field device and a power limited source operatively connected to the field device and configured to supply a main power to the field device up to a power limit threshold. The system can include a bulk energy storage assembly operatively connected to the field device. The bulk energy storage assembly can be configured to provide a supplemental power to the field device when either the main power drops below a demand power from the field device, or when the demand power from the field device exceeds the power limit threshold.

The power limited source can be intrinsically safe. For example, the power limited source can be an advanced physical layer (APL) system.

In certain embodiments, the system includes Galvanic isolation between the power limited source and the field device. In certain embodiments, the field device can be a sensor. In certain embodiments, the bulk energy storage assembly can be integral with the field device.

In certain embodiments, the bulk energy storage assembly can include a circuit having one or more intrinsically safe inputs. The bulk energy storage assembly can include one or more energy storage devices configured to store the supplemental power. In certain embodiments, the one or more energy storage devices can be sized to store at least enough energy to provide at least 10 milliseconds of supplemental power at a nominal system load or at a full power load with or without main power. The one or more energy storage devices can include one or more capacitors, for example.

In certain embodiments, the circuit can include a plurality of input branches connected in parallel. In certain embodiments, the circuit can include a plurality of energy storage devices. In certain embodiments, the one or more energy storage devices can include a first energy storage device on each input branch of the circuit.

In certain embodiments, the one or more energy storage devices can include a second energy storage device downstream of the input branches. In certain embodiments, the circuit can include filter assembly downstream of the plurality of branches (e.g., which can include the second energy storage device, or the only energy storage device in certain embodiments).

In accordance with at least one aspect of this disclosure, an intrinsically safe field device can include one or more inputs configured to connect to a power limited source to operatively to receive a main power up to a power limit threshold, and a bulk energy storage assembly, e.g., as disclosed herein. The field device can be any suitable type of field device.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
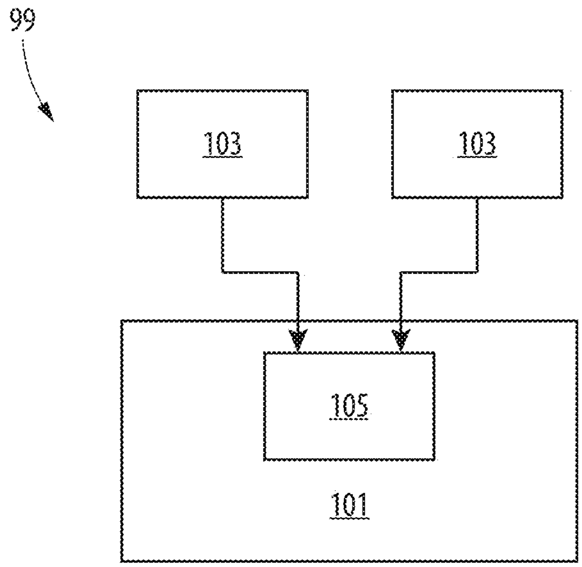
FIG. 1 is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 99. Other views, embodiments, and/or aspects of this disclosure are illustrated in FIGS. 1A-3.

In accordance with at least one aspect of this disclosure, referring to FIG. 1, a system 99 can include a field device 101 (e.g., also referred to as an edge device or edge field device) and a power limited source 103 operatively connected to the field device 101 and configured to supply a main power to the field device 101 up to a power limit threshold (e.g., an intrinsically safe threshold for hazardous environments). The field device 101 can be a strobe device, a transmission device (e.g., for a satellite signal), or any other suitable device.

The system 99 can include a bulk energy storage assembly 105 operatively connected to the field device 101 (e.g., in line with or separately from the power limited source 103). The bulk energy storage assembly 105 can be configured to provide a supplemental power to the field device 101 when either the main power drops below a demand power from the field device 101 (e.g., due to a brownout or total loss of power), or when the demand power from the field device 101 exceeds the power limit threshold (e.g., where the field device 101 can operate in a mode that requires a boost in power above what the maximum power limit threshold).

In certain embodiments, the power limited source 103 can be intrinsically safe. For example, the power limited source 103 can be an advanced physical layer (APL) system.

In certain embodiments, the system 99 includes Galvanic isolation between the power limited source 103 and the field device 101 (e.g., and between the bulk energy storage assembly 105 and the power limited source 103). In certain embodiments, e.g., as shown, the bulk energy storage assembly 105 can be integral with the field device 101. The bulk energy storage assembly 105 can be or include a battery or other suitable power storage medium (e.g., a capacitor) configured to supply supplemental energy for a desired time (e.g., to prevent device shutdown during short power loss scenarios such as brownouts, or to provide excess power during short bursts of peak demand from the field device 101).

Figure 2:
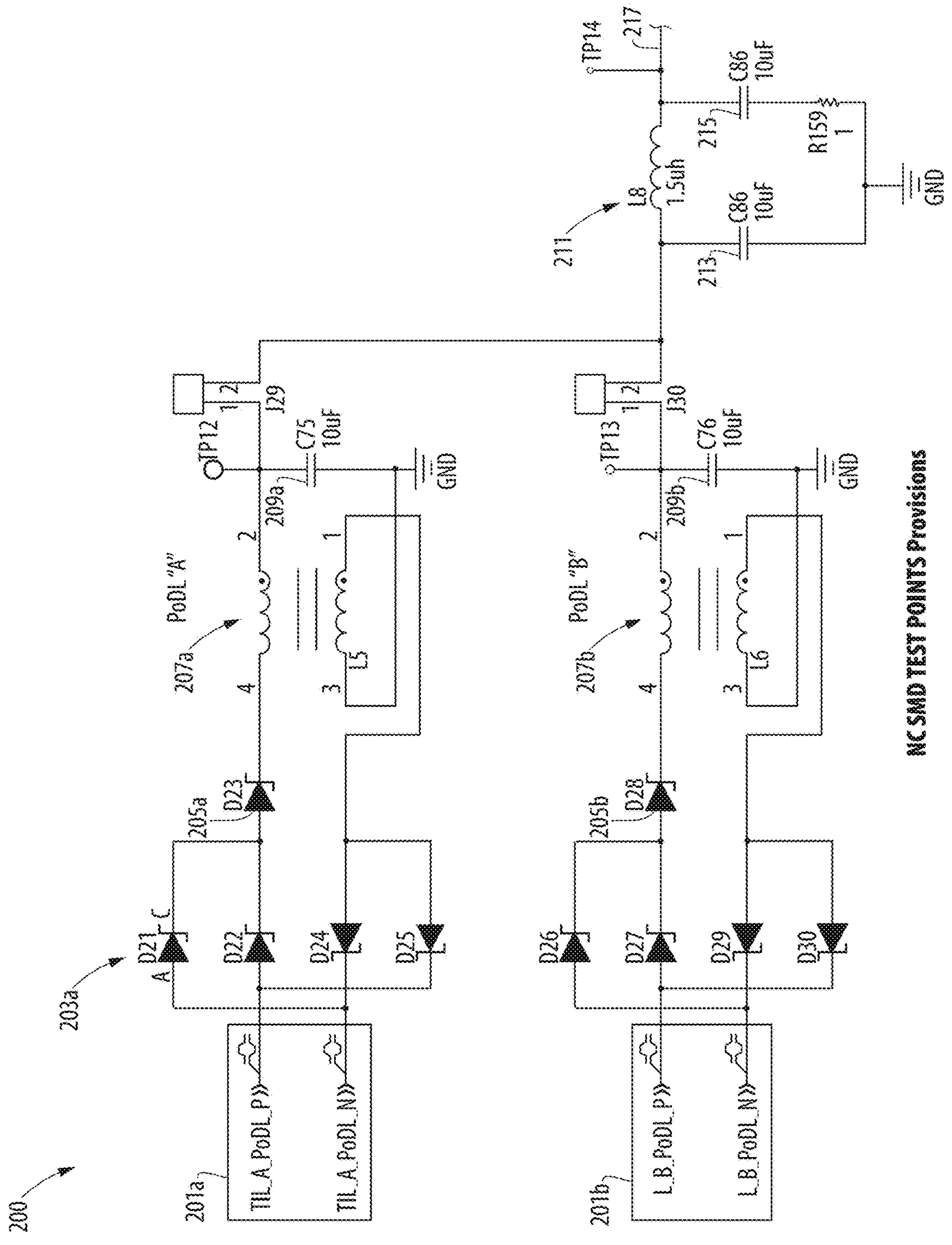
FIG. 2 shows an example implementation of bulk energy storage in accordance with embodiments of the disclosure.
Figure 3:
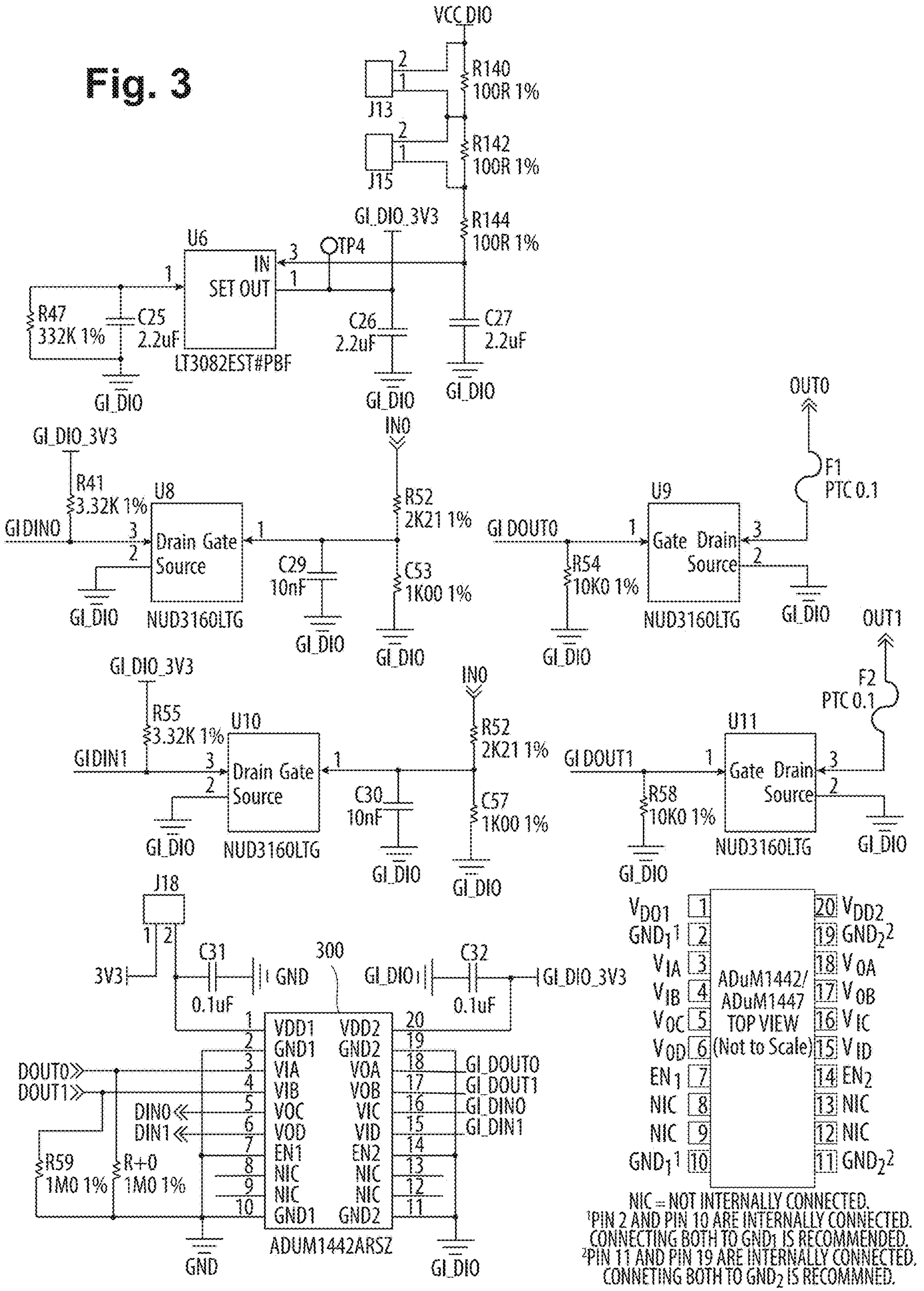
FIG. 3 shows an example implementation of digital input/output in accordance with embodiments of the disclosure.

In certain embodiments, the field device 101 can be a sensor. Any other suitable type of device is contemplated herein. The field device 101 and/or the bulk energy storage assembly 105 can include any suitable hardware and/or software module(s) configured to determine when to supply supplemental power from the bulk energy storage assembly 105. For example, certain circuitry can be implemented (e.g., as shown in FIG. 2 and FIG. 3) to provide bulk energy storage as well as Galvanically isolated digital inputs and outputs.

Embodiments can include a field device bulk energy storage and digital input/output system. Certain embodiments can include field devices, and more particularly, to systems and methods relating to Field Device bulk energy storage and digital input/output. Certain embodiments can include systems and methods relating to field device bulk energy storage and digital input/output. Embodiments can include a digital Input/Output and provide APL powered intrinsically safe, Galvanically isolated digital inputs and outputs. Embodiments can allow a networked IS device to control digital outputs and read digital inputs in a hazardous location.

Embodiments can include bulk energy storage local to the field device. For example, embodiments can include bulk energy storage in an edge device off of an APL, which can allow continuous and/or continuing operation of edge field devices in limited power or brownout conditions.

Figure 1A:
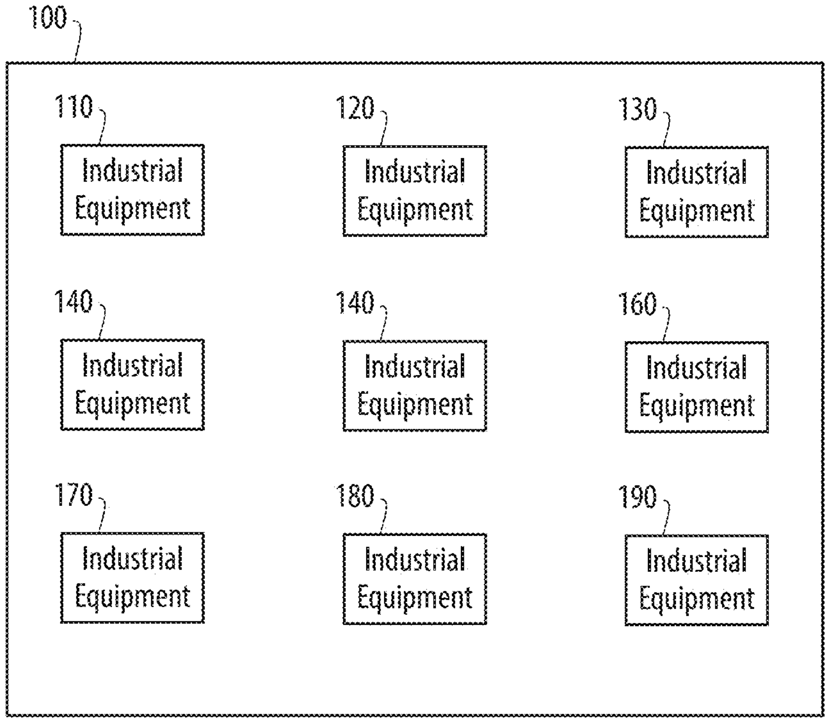
FIG. 1A shows an example industrial operation in accordance with embodiments of the disclosure.

Referring additionally to FIG. 1A, an example industrial operation 100 in accordance with embodiments of the disclosure includes a plurality of industrial equipment 110, 120, 130, 140, 150, 160, 170, 180, 190. The industrial equipment (or devices) 110, 120, 130, 140, 150, 160, 170, 180, 190 may be associated with a particular application (e.g., an industrial application), applications, and/or process(es). The industrial equipment 110, 120, 130, 140, 150, 160, 170, 180, 190 may include electrical or electronic equipment, for example, such as machinery associated with the industrial operation 100 (e.g., a manufacturing or natural resource extraction operation). The industrial equipment 110, 120, 130, 140, 150, 160, 170, 180, 190 may also include the controls and/or ancillary equipment associated with the industrial operation 100, for example, Field Devices (e.g., RTUs, PLCs, actuators, sensors, HMIs) that are used perform, analyze and/or control process variable measurements. In embodiments, the industrial equipment 110, 120, 130, 140, 150, 160, 170, 180, 190 may be installed or located in one or more facilities (i.e., buildings) or other physical locations (i.e., sites) associated with the industrial operation 100. The facilities may correspond, for example, to industrial buildings or plants. Additionally, the physical locations may correspond, for example, to geographical areas or locations.

The industrial equipment 110, 120, 130, 140, 150, 160, 170, 180, 190 may each be configured to perform one or more tasks in some embodiments. For example, at least one of the industrial equipment 110, 120, 130, 140, 150, 160, 170, 180, 190 may be configured to produce or process one or more products, or a portion of a product, associated with the industrial operation 100. Additionally, at least one of the industrial equipment 110, 120, 130, 140, 150, 160, 170, 180, 190 may be configured to sense or monitor one or more parameters (e.g., industrial parameters) associated with the industrial operation 100. For example, industrial equipment 110 may include or be coupled to a temperature sensor configured to sense temperature(s) associated with the industrial equipment 110, for example, ambient temperature proximate to the industrial equipment 110, temperature of a process associated with the industrial equipment 110, temperature of a product produced by the industrial equipment 110, etc. The industrial equipment 110 may additionally or alternatively include one or more pressure sensors, flow sensors, level sensors, vibration sensors and/or any number of other sensors, for example, associated the application(s) or process(es) associated with the industrial equipment 110. The application(s) or process(es) may involve water, air, gas, electricity, steam, oil, etc. in one example embodiment.

The industrial equipment 110, 120, 130, 140, 150, 160, 170, 180, 190 may take various forms and may each have an associated complexity (or set of functional capabilities and/or features). For example, industrial equipment 110 may correspond to a "basic" industrial equipment, industrial equipment 120 may correspond to an "intermediate" industrial equipment, and industrial equipment 130 may correspond to an "advanced" industrial equipment. In such embodiments, intermediate industrial equipment 120 may have more functionality (e.g., measurement features and/or capabilities) than basic industrial equipment 110, and advanced industrial equipment 130 may have more functionality and/or features than intermediate industrial equipment 120. For example, in embodiments industrial equipment 110 (e.g., industrial equipment with basic capabilities and/or features) may be capable of monitoring one or more first characteristics of an industrial process, and industrial equipment 130 (e.g., industrial equipment with advanced capabilities) may be capable of monitoring one or more second characteristics of the industrial process, with the second characteristics including the first characteristics and one or more additional parameters. It is understood that this example is for illustrative purposes only, and likewise in some embodiments the industrial equipment 110, 120, 130, etc. may each have independent functionality.

In certain embodiments, the industrial operation 100, and its associated equipment and process(es), may be operated and controlled using a Distributed Control System (DCS) in some instances. FIG. 2 shows an example implementation of bulk energy storage in a circuit 200 in accordance with certain embodiments of the disclosure.

As shown, the circuit 200 can be configured received two inputs 201*a*, 201*b* in parallel (e.g., two intrinsically safe APL connections each having a positive and negative input), but any suitable number of inputs (e.g., one, more than two) of any suitable wire count are contemplated herein. Multiple inputs in parallel as shown can provide redundancy and/or provide more power (e.g., 2 times the amount) while maintaining intrinsic safety. Embodiments having multiple inputs can also direct traffic of one type (e.g., data of a certain type, power, etc.) over one line and traffic of another type over another line.

The circuit 200 can include a plurality of diodes 203*a*, 203*b* downstream of each input 201*a*, 201*b* on each branch thereof (e.g., two for each line of each input 201*a*, 201*b*, e.g., four) configured to allow reversible connection to accounts for polarity inversion. The circuit 200 can include one way diode 235*a*, 235*b* downstream of diodes 203*a*, 203*b* configured to prevent backward current onto the input line. The diodes 203*a*, 203*b*, 205*a*, 205*b* can act to make the circuit 200 intrinsically safe by preventing back feeding from a downstream energy storage device. In the arrangement shown, up to two diodes out of the five can fail and the circuit still provides intrinsic safety.

The circuit 200 can include inductor arrangements 207*a*, 207*b* downstream of the diodes 205*a*, 205*a* (e.g., differential mode chokes to provide a data connection). For example, the inductor arrangements 207*a*, 207*b* can prevent a downstream energy storage device from absorbing the data, for example.

In certain embodiments, as shown in FIG. 2, the circuit 200 can include one or more bulk energy storage devices 209*a*, 209*b* in each branch (e.g., connected between inductors of a respective inductor arrangements 207*a*, 207*b* respectively). The one or more bulk energy storage devices 209*a*, 209*b* can be or include a capacitor as shown, or any other suitable storage device (e.g., a battery). In certain embodiments, there can be a single energy storage device for all branches, or for a plurality of branches.

In certain embodiments, the circuit 200 can include a filter assembly 211, e.g., downstream of the branches of the inputs. The filter assembly 211 can be configured to smooth the voltage from branches. The filter assembly 211 can include an inductor 213 configured to provides isolation, e.g., to prevent against reflected power spikes at start up. The filter assembly 211 can include one or more energy storage devices 213, 215 (e.g., capacitors) as shown (e.g., which can aid in smoothing the power). The filter assembly 211 can be connected to a main line 217 for connecting to a load (e.g., the field device 101 or the power consuming portions thereof). The circuit 200 can form part of the field device 101, for example. In certain embodiments, the circuit 200 and/or the energy storage devices 209*a*, 209*b*, 213, 215 may be encapsulated for intrinsically safe certification.

Accordingly, in accordance with the above disclosure, in certain embodiments, the bulk energy storage assembly 105 can be or include a circuit 200 having one or more intrinsically safe inputs 201*a*, 201*b*. The bulk energy storage assembly 105 can include one or more energy storage devices 209*a*, 209*b*, 213, 215 configured to store the supplemental power. In certain embodiments, the one or more energy storage devices 209*a*, 209*b*, 213, 215 can be sized to store at least enough energy to provide at least 10 milliseconds of supplemental power at a nominal system load or at a full power load (with or without some or all of main power). The one or more energy storage devices 209*a*, 209*b*, 213, 215 can include one or more capacitors, for example, e.g., as shown in FIG. 2.

For example, the one or more energy storage devices 209*a*, 209*b*, 213, 215 can be configured to supply the at least 10 milliseconds of power at a few Watts of power, a nominal power, or a peak power, or any other suitable power level to maintain operation of the field device 101. In this regard, in the case of capacitors, the one or more energy storage devices 209*a*, 209*b*, 213, 215 can be more ten times as large (e.g., ten times the capacitance) as a traditional circuit capacitor for filter use, for example.

In certain embodiments, the circuit 200 can include a plurality of input branches (e.g., top and bottom branches shown in FIG. 2) connected in parallel. In certain embodiments, the circuit 200 can include a plurality of energy storage devices 209*a*, 209*b*, 213, 215, however, a single energy storage device (e.g., just device 213) having suitable energy storage is contemplated herein. In certain embodiments, the one or more energy storage devices 209*a*, 209*b*, 213, 215 can include a first energy storage device 209*a*, 209*b* on each input branch of the circuit 200.

In certain embodiments, the one or more energy storage devices 209*a*, 209*b*, 213, 215 can include a second energy storage device 213 downstream of the input branches. In certain embodiments, the circuit 200 can include filter assembly 211 downstream of the plurality of branches (e.g., which can include the second energy storage device 213, or the only energy storage device in certain embodiments).

In accordance with at least one aspect of this disclosure, an intrinsically safe field device 101 can include one or more inputs (e.g., inputs 201*a*, 201*b*) configured to connect to a power limited source (e.g., an APL Ethernet cable) to operatively to receive a main power up to a power limit threshold, and a bulk energy storage assembly 105, e.g., as disclosed herein (e.g., including a circuit 200 as disclosed above). The field device can be any suitable type of field device.

FIG. 3 shows an example implementation of digital input/output in accordance with embodiments of the disclosure. As shown, a chip 300 can isolate both sides and provide a digital I/O off of an APL system with Galvanic isolation.

In certain embodiments, the term "edge" can describe Layer 0 of the Purdue Network Model for Industrial Control Systems. In certain embodiments, a field device can include intelligent field instruments with embedded control/compute/measurement capability implemented on lower power embedded microcontroller based platform.

In certain embodiments, the term "Machine Learning (ML)" can be used to refer to the use and development of software that is able to learn and adapt without following explicit instructions, by using algorithms and statistical models to analyze and draw inferences from patterns in data. In certain embodiments, the term "Embedded Device" can be used to refer to a combination of a microcontroller, memory, and input/output peripherals, that has a dedicated function within a larger system. In certain embodiments, the term "Networked" can refer to being connected via Ethernet.

In certain embodiments, the term "High availability" can be used to refer to a device or application that can operate at a high level, continuously, without intervention, for a given time period. High-availability infrastructure can be configured to deliver quality performance and handle different loads and failures with minimal or zero downtime. In certain embodiments, the term "Intrinsically Safe (IS)" can be used to refer to an approach to the design of equipment going into hazardous areas that reduces the available energy to a level where it is too low to cause ignition as certified by per IEC TS 60079-39 or ATEX, for example.

Embodiments can be used in numerous applications. Such fields of application may include, for example, oil and gas, energy, food and beverage, water and wastewater, chemical, petrochemical, pharmaceutical, metal, and mining and mineral applications.

Certain embodiments can include bulk energy storage in an edge device off an APL, allowing for continuous and/or continuing operation of edge field devices in limited power or brownout conditions. Certain embodiments can include an APL powered intrinsically safe, Galvanically isolated digital inputs and outputs, allowing a networked IS device to control digital outputs and read digital inputs in a hazardous location.

Certain embodiments can include an Advanced Physical Layer (APL) powered edge field device, comprising at least one bulk energy storage device for storing excess electrical energy generated by at least one intrinsically safe APL port power source coupled to and configured to power the Edge Field Device. The field device can be configured such that in response to the amount of electrical energy generated by the at least one intrinsically safe APL port power source falling below a level sufficient to power one or more components of the edge field device, the one or more components of the edge field device are powered using the stored electrical energy of the at least one bulk energy storage device. The stored electrical energy of the at least one bulk energy storage device can allow for intermittent energy usage that exceeds the allowable electrical energy provided by the at least one intrinsically safe APL port power source. In certain embodiments, the at least one bulk energy storage device can be or include at least one capacitor. In certain embodiments, the at least one bulk energy storage device can be or include at least one battery.

In accordance with one or more embodiments of this disclosure, bulk energy storage in an APL powered edge field device can allow for continuous and/or continuing operation of the device in limited power or brownout conditions. In addition, the stored energy can allow for intermittent peak energy usage that exceeds the allowable energy provided by the APL port[s] power source[s]. In accordance with one or more embodiments of this disclosure, an intrinsically safe APL port power sources can be strictly limited in the amount of power that they can supply. If an edge field device intermittently requires more peak power than the APL port can supply, the bulk energy storage can provide it while still keeping the average power drawn from the APL port within its allowable limits, for example.

Embodiments can provide an intrinsically safe, multi-port, APL powered networked device with bulk energy storage. Embodiments can include dual power over data lines interfaced with full-wave bridge rectifiers and Pi filters feeding bulk capacitors and/or secondary cells.

In accordance with one or more embodiments of this disclosure, a system can include one or more end point field devices that are APL based, intrinsically safe, and that have Galvanically isolated digital inputs and outputs. Such systems can provide the capability to monitor and to control external digital circuits through IP via its 10BaseT1-L APL interface. Hazardous locations can require strict protection methods to eliminate any possible electrical ignition sources. Embodiments can provide this protection while also providing the APL interface.

Embodiments can include any suitable computer hardware and/or software module(s) to perform any suitable function (e.g., as disclosed herein). Any suitable method(s) or portion(s) thereof disclosed herein can be performed on and/or by any suitable hardware and/or software module(s).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:

a field device;

a power limited source operatively connected to the field device and configured to supply a main power to the field device up to a power limit threshold; and a bulk energy storage assembly operatively connected to the field device while the power limited source is operatively connected to the field device, wherein the bulk energy storage assembly is configured to provide a supplemental power to the field device when the main power drops below a demand power from the field device, and also when the demand power from the field device exceeds the power limit threshold, wherein the field device includes a data connection operatively coupled to the power limited source, and wherein the data connection is configured to prevent the bulk energy storage assembly from absorbing data conveyed by the power limited source.

2. The system of claim 1, wherein the power limited source is intrinsically safe.

3. The system of claim 2, wherein the power limited source is an advanced physical layer (APL) system.

4. The system of claim 1, wherein the system includes Galvanic isolation between the power limited source and the field device.

5. The system of claim 1, wherein the field device is a sensor.

6. The system of claim 1, wherein the bulk energy storage assembly is integral with the field device.

7. The system of claim 1, wherein the bulk energy storage assembly includes a circuit having one or more intrinsically safe inputs.

8. The system of claim 7, wherein the bulk energy storage assembly includes one or more energy storage devices configured to store the supplemental power.

9. The system of claim 8, wherein the one or more energy storage devices are sized to store at least enough energy to provide at least 10 milliseconds of supplemental power at a nominal system load or at a full power load with or without main power.

10. The system of claim 9, wherein the one or more energy storage devices include one or more capacitors.

11. The system of claim 10, wherein the circuit includes a plurality of input branches connected in parallel.

12. The system of claim 11, wherein the circuit includes a plurality of energy storage devices.

13. The system of claim 12, wherein the one or more energy storage devices include a first energy storage device on each input branch of the circuit.

14. The system of claim 13, wherein the one or more energy storage devices include a second energy storage device downstream of the plurality of input branches.

15. The system of claim 14, further comprising a filter assembly downstream of the plurality of input branches.

16. The system of claim 1, wherein the data connection comprises inductors inductively coupled together and connected in electrical parallel.

17. The system of claim 1, wherein the bulk energy storage assembly a diode configured to prevent back feeding from a downstream energy storage device.

18. An intrinsically safe field device, comprising:

one or more inputs configured to connect to a power limited source to operatively to receive a main power up to a power limit threshold; and a bulk energy storage assembly, wherein the bulk energy storage assembly is configured to provide a supplemental power, while the power limited source is operatively connected to the field device, when the main power drops below a demand power from the field device, and also when the demand power from the field device exceeds the power limit threshold, wherein the field device includes a data connection operatively coupled to the power limited source, and wherein the data connection is configured to prevent the bulk energy storage assembly from absorbing data conveyed by the power limited source.

19. The intrinsically safe field device of claim 18, wherein the power limited source is intrinsically safe.

20. The intrinsically safe field device of claim 19, wherein the power limited source is an advanced physical layer (APL) system.

* * * * *